United States Patent
Fukushima

(10) Patent No.: US 10,967,745 B2
(45) Date of Patent: Apr. 6, 2021

(54) PARKING ASSISTANCE METHOD AND PARKING ASSISTANCE DEVICE

(71) Applicant: NISSAN MOTOR CO., LTD., Yokohama (JP)

(72) Inventor: Yoshitake Fukushima, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 176 days.

(21) Appl. No.: 16/302,340

(22) PCT Filed: May 18, 2016

(86) PCT No.: PCT/JP2016/064715
§ 371 (c)(1),
(2) Date: Nov. 16, 2018

(87) PCT Pub. No.: WO2017/199362
PCT Pub. Date: Nov. 23, 2017

(65) Prior Publication Data
US 2019/0160971 A1 May 30, 2019

(51) Int. Cl.
| | |
|---|---|
| *B60L 50/50* | (2019.01) |
| *B60L 53/12* | (2019.01) |
| *B60R 21/00* | (2006.01) |
| *G08G 1/16* | (2006.01) |
| *B62D 15/02* | (2006.01) |

(Continued)

(52) U.S. Cl.
CPC ............... *B60L 50/50* (2019.02); *B60L 53/12* (2019.02); *B60L 53/37* (2019.02); *B60L 53/38* (2019.02); *B60R 21/00* (2013.01); *B62D 15/028* (2013.01); *B62D 15/0275* (2013.01); *G08G 1/16* (2013.01); *Y02T 10/70* (2013.01)

(58) Field of Classification Search
USPC .......................................................... 701/22
See application file for complete search history.

(56) References Cited

U.S. PATENT DOCUMENTS

| | | | |
|---|---|---|---|
| 8,423,223 | B2 | 4/2013 | Nakamura et al. |
| 10,000,135 | B2 | 6/2018 | Yoshida et al. |

(Continued)

FOREIGN PATENT DOCUMENTS

| | | |
|---|---|---|
| JP | 5377119 B2 | 12/2013 |
| JP | 2015-105070 A | 6/2015 |

(Continued)

*Primary Examiner* — Nicholas K Wiltey
*Assistant Examiner* — Terry C Buse
(74) *Attorney, Agent, or Firm* — Foley & Lardner LLP

(57) ABSTRACT

A parking assistance method provides parking assistance when parking a vehicle in a parking space equipped with a ground coil for supplying electric power via a wireless connection to a vehicle coil mounted on the vehicle, at least two ground marks indicating a position of the ground coil, and a parking frame. The parking assistance method switches from a bird's-eye image including the vehicle and a circumference of the vehicle as viewed from above the vehicle to an enlarged image showing a relative position between the ground coil and the vehicle coil on a larger scale than the bird's-eye image when an absolute value of a relative angle between a longitudinal direction of the parking frame and a front-rear direction of the vehicle is a predetermined value or smaller.

5 Claims, 17 Drawing Sheets

(51) Int. Cl.
 *B60L 53/37* (2019.01)
 *B60L 53/38* (2019.01)

(56) References Cited

U.S. PATENT DOCUMENTS

| | | | |
|---|---|---|---|
| 2012/0095617 A1* | 4/2012 | Martin | G05D 1/028 |
| | | | 701/1 |
| 2012/0323423 A1 | 12/2012 | Nakamura et al. | |
| 2014/0152774 A1* | 6/2014 | Wakabayashi | G06T 3/005 |
| | | | 348/46 |
| 2015/0073642 A1* | 3/2015 | Widmer | G01C 21/36 |
| | | | 701/22 |
| 2015/0375631 A1 | 12/2015 | Ueda | |
| 2016/0046198 A1* | 2/2016 | Krammer | B60L 11/1833 |
| | | | 701/22 |
| 2016/0243955 A1 | 8/2016 | Yoshida et al. | |
| 2016/0288657 A1 | 10/2016 | Tokura | |
| 2016/0332572 A1* | 11/2016 | Gibeau | G06T 11/00 |
| 2017/0001563 A1 | 1/2017 | Fukushima | |

FOREIGN PATENT DOCUMENTS

| | | | | |
|---|---|---|---|---|
| JP | WO2015093513 | * | 6/2015 | B60L 11/182 |
| JP | 2015-120378 A | | 7/2015 | |
| JP | 2015-232199 A | | 12/2015 | |
| KR | 10-2016-0046875 A | | 4/2016 | |
| RU | 2557647 C2 | | 7/2015 | |
| WO | WO 2013/146139 A1 | | 10/2013 | |
| WO | WO 2014/192136 A1 | | 12/2014 | |
| WO | WO 2015/045141 A1 | | 4/2015 | |
| WO | WO-2015/093513 A1 | | 6/2015 | |
| WO | WO-2015/114775 A1 | | 8/2015 | |

* cited by examiner

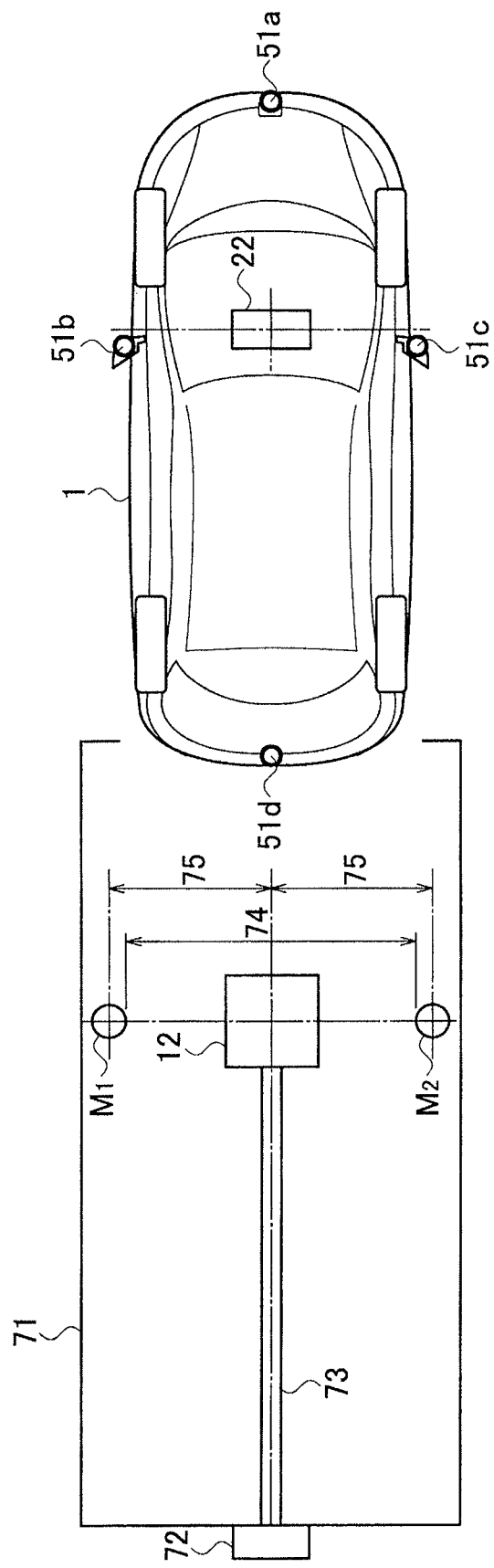

US 10,967,745 B2

PARKING ASSISTANCE METHOD AND PARKING ASSISTANCE DEVICE

TECHNICAL FIELD

The present invention relates to a parking assistance method and a parking assistance device.

BACKGROUND ART

Parking assistance systems are known to provide parking assistance in accurately leading a vehicle to a power supply facility (refer to Patent Literature 1). A parking assistance system disclosed in Patent Literature 1 displays a first image of a rear side behind a vehicle on a display unit, generates a second image including information about positioning, which cannot be obtained from the first image, when a distance between the vehicle and a target parking position is less than a predetermined value, and starts displaying the second image on the display unit.

CITATION LIST

Patent Literature

Patent Literature 1: Japanese Patent No. 5377119

SUMMARY OF INVENTION

The second image in Patent Literature 1 shows a distance between a power receiving unit and a power supply unit, but does not indicate a displaced direction or angle between the units. This may confuse a user as to which direction the vehicle should be moved in during coil alignment.

In view of the above problem, the present invention provides a parking assistance method and a parking assistance device for providing a user with a means of easily recognizing a relative position between a ground coil and a vehicle coil at the right time that the user requires.

Solution to Problem

An aspect of the present invention is a parking assistance method for providing parking assistance when parking a vehicle in a parking space equipped with a ground coil for supplying electric power via a wireless connection to a vehicle coil mounted on the vehicle, at least two ground marks indicating a position of the ground coil, and a parking frame, wherein a bird's-eye image including the vehicle and a circumference of the vehicle as viewed from above the vehicle is switched to an enlarged image showing a relative position between the ground coil and the vehicle coil on a larger scale than the bird's-eye image when an absolute value of a relative angle of a straight line connecting the ground marks to a straight line passing through a center of the vehicle coil and parallel to a vehicle width direction of the vehicle is a predetermined value or smaller.

Advantageous Effects

The aspect of the present invention can provide a user with a means of easily recognizing a relative position between the ground coil and the vehicle coil at the right time that the user requires.

BRIEF DESCRIPTION OF DRAWINGS

FIG. 3B is a top view illustrating backward parking of the vehicle 1 moving backward to enter the parking space equipped with the power supply device 100.

DESCRIPTION OF EMBODIMENTS

First Embodiment

Figure 1:
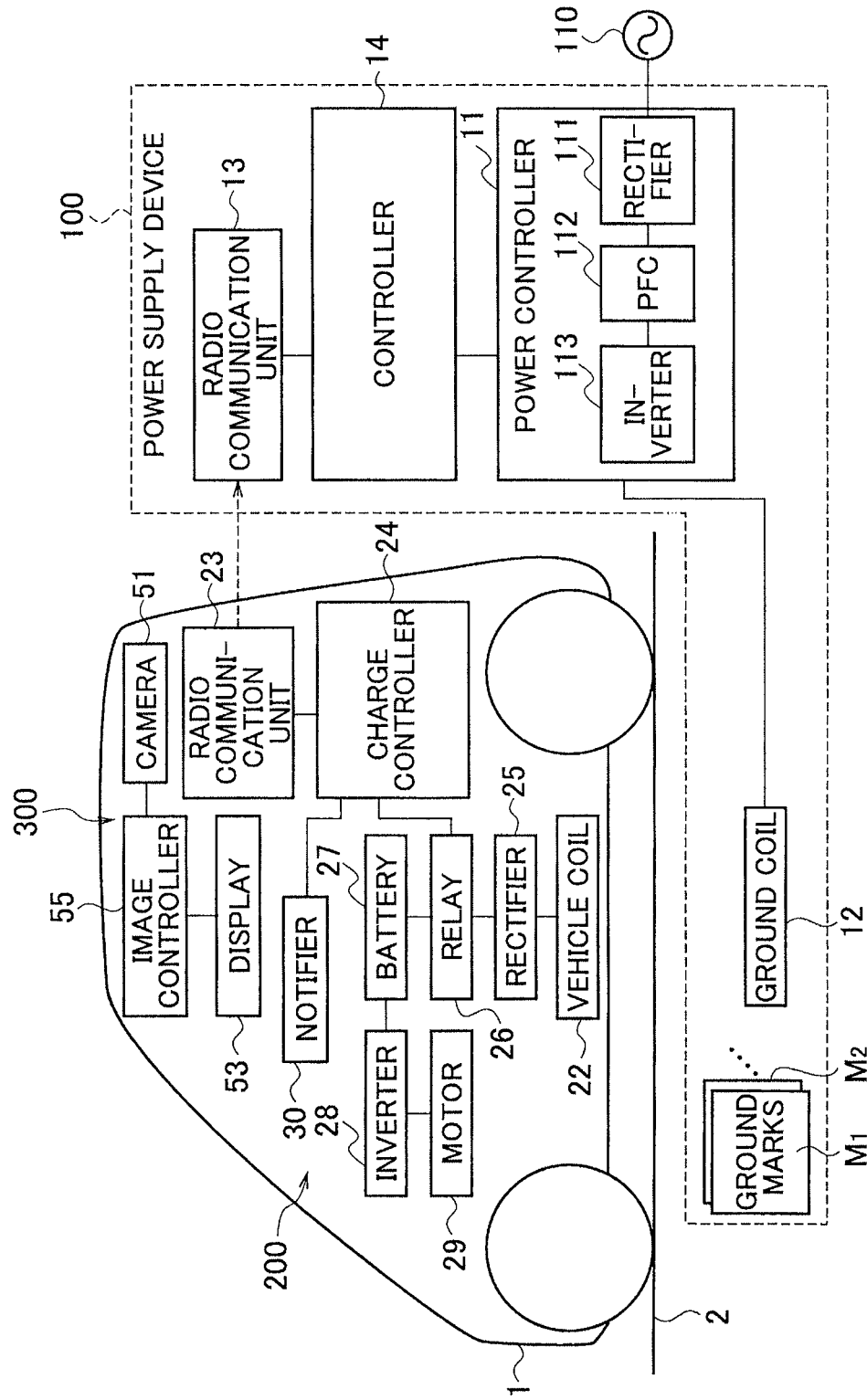
FIG. 1 is a block diagram showing an entire configuration of a wireless power supply system including a parking assistance device according to an embodiment.

An embodiment will be described in detail below with reference to the drawings.

An entire configuration of a wireless power supply system including a parking assistance device according to this embodiment is described below with reference to FIG. 1. The wireless power supply system includes a power supply device 100 which is a ground-side unit, a power receiving device 200 which is a vehicle-side unit, and a parking assistance device 300. The wireless power supply system supplies electric power via a wireless connection from the power supply device 100 placed in a power supply station, for example, to the power receiving device 200 installed in a vehicle 1 such as an electric vehicle or a hybrid vehicle so as to charge a battery mounted on the vehicle 1. The parking assistance device 300 assists a user in positioning of the vehicle 1 and coil alignment when the user parks the vehicle 1 in a parking space equipped with the power supply device 100.

The power supply device 100 includes a ground coil 12 placed in the parking space 2 adjacent to the power supply station, and at least two ground marks ($M_1$, $M_2$) indicating a position of the ground coil 12. The power receiving device 200 includes a vehicle coil 22 mounted on the base of the vehicle 1. The vehicle coil 22 is positioned so as to be opposed to the ground coil 12 when the vehicle 1 is parked at a predetermined stop position in the parking space.

The ground coil 12 is a primary coil made of a conductive wire to serve as a power transmission coil for transmitting electric power to the vehicle coil 22. The vehicle coil 22 is a secondary coil made of a conductive wire to serve as a power receiving coil for receiving the electric power transmitted from the ground coil 12. The electric power is supplied from the ground coil 12 to the vehicle coil 22 in a wireless manner through electromagnetic induction between the ground coil 12 and the vehicle coil 22.

The power supply device 100 on the ground side includes a power controller 11, the ground coil 12, a radio communication unit 13, and a controller 14.

The power controller 11 is a circuit for converting AC power transmitted from an AC power source 110 into high-frequency AC power and transmitting the converted power to the ground coil 12. The power controller 11 includes a rectifier 111, a power factor correction (PFC) circuit 112, and an inverter 113.

The rectifier 111 is a circuit electrically connected to the AC power source 110 to rectify the AC power output from the AC power source 110. The PFC circuit 112 is connected between the rectifier 111 and the inverter 113 to implement power factor correction by rectifying waveforms output from the rectifier 111. The inverter 113 includes a pulse width modulation (PWM) control circuit including a switching device such as an insulated gate bipolar transistor (IGBT) to convert DC power into AC power in accordance with a switching control signal so as to supply the AC power to the ground coil 12.

The radio communication unit 13 communicates with a radio communication unit 23 installed on the vehicle 1 side.

The controller 14 controls the entire power supply device 100, and particularly controls the communication between the respective radio communication units 13 and 23. For example, the controller 14 transmits a signal for starting power supply from the wireless power supply device 100 toward the vehicle 1 and receives, from the vehicle 1 side, a request signal for requesting power supply from the wireless power supply device 100. The controller 14 also controls the switching operation of the inverter 113 and regulates the electric power transmitted from the ground coil 12.

The power receiving device 200 on the vehicle 1 side includes the vehicle coil 22, the radio communication unit 23, a charge controller 24, a rectifier 25, a relay 26, a battery 27, an inverter 28, a motor 29, and a notifier 30.

The vehicle coil 22 is positioned immediately above the ground coil 12 and separated by a predetermined distance from the ground coil 12 when the vehicle 1 is parked at a predetermined parking position in the parking space 2.

The radio communication unit 23 communicates with the radio communication unit 13 installed on the power supply device 100 side.

The charge controller 24 controls a charging operation of the battery 27, and further controls the wireless communication unit 23, the notifier 30, and the relay 26, for example. The charge controller 24 transmits a request signal for requesting a start of charge through the communication between the radio communication units 13 and 23 after the vehicle is parked and the coil alignment is finished.

The rectifier 25 is a rectifying circuit connected to the vehicle coil 22 to rectify the AC power received by the vehicle coil 22 into DC power.

The relay 26 includes a relay switch that is turned on/off in accordance with the control by the charge controller 24. The relay 26 disconnects a main circuit system including the battery 27 from a charge circuit including the vehicle coil 22 and the rectifier 25 when the relay switch is turned off.

The battery 27 includes a plurality of secondary batteries connected to each other to serve as a power source of the vehicle 1.

The inverter 28 includes a PWM control circuit including a switching device such as an IGBT. The inverter 28 converts DC power output from the battery 27 into AC power and supplies the converted power to the motor 29.

The motor 29 is, for example, a three-phase AC motor serving as a drive power source for driving the vehicle 1.

The notifier 30 includes a warning light, a display for a navigation system, or a speaker, and outputs light, images, or voice toward the user in accordance with the control by the charge controller 24.

The wireless power supply system having the configuration described above conducts the transmission and reception of high-frequency electric power in a wireless manner through the electromagnetic induction between the ground coil 12 and the vehicle coil 22. Once a voltage is applied to the ground coil 12, a magnetic connection is caused between the ground coil 12 and the vehicle coil 22, so that the electric power is supplied from the ground coil 12 to the vehicle coil 22.

The parking assistance device 300 includes a camera 51 for capturing the circumference of the vehicle 1, a display 53 for providing image information to assist the user (occupant of the vehicle 1) in positioning of the vehicle 1 and coil alignment, and an image controller 55 for controlling the image information.

Figure 2:
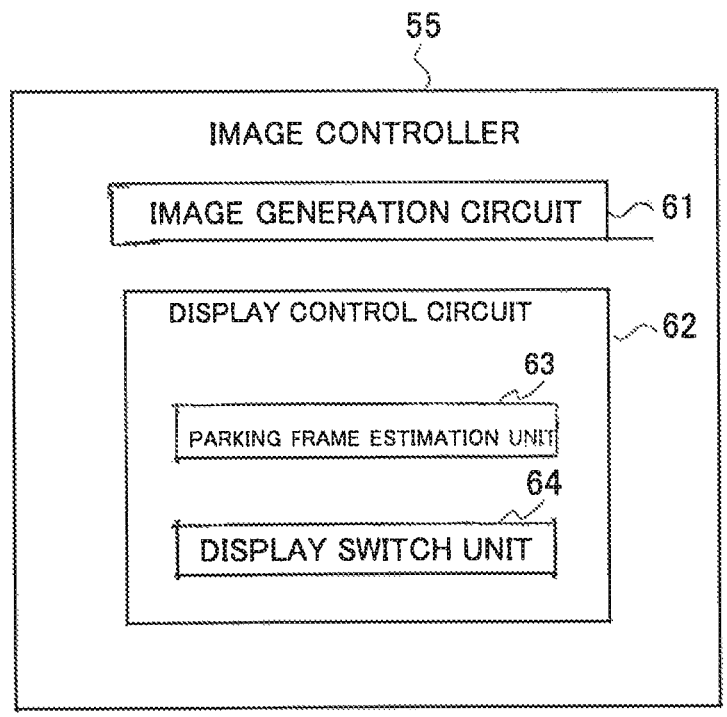
FIG. 2 is a block diagram showing a specific configuration of an image controller 55.

A specific configuration of the image controller 55 is described below with reference to FIG. 2. The image controller 55 may be a general-purpose microcomputer including a memory and an input/output unit. A computer program (a parking assistance program) is installed in the image controller 55 so as to execute a series of information processing to assist in the vehicle movement and the coil alignment. The image controller 55 implementing the program serves as information processing circuits (61, 62) for executing the series of information processing.

While the present embodiment is illustrated with the case in which the software is installed to fabricate the image controller 55, it should be understood that dedicated hardware such as an application specific integrated circuit (ASIC) can be used, instead of a general-purpose microcomputer, to compose the information processing circuits (61, 62). The information processing circuits (61, 62) included in the image controller 55 may each be composed of individual hardware. The image controller 55 may also serve as an electronic control unit (ECU) used for other control processing in the vehicle 1.

The image controller 55 acquires a camera image of the circumference of the vehicle 1 captured. The image controller 55 functions as an image generation circuit 61 for generating, from the camera image, a bird's-eye image including the vehicle 1 and the circumference of the vehicle 1 as viewed from above the vehicle 1, and functions as a display control circuit 62 for controlling images displayed on the display 53.

The image generation circuit 61 uses conventional technology to generate the bird's-eye image obtained by converting an angle of the camera image from a position of the camera 51 to a position immediately above the vehicle 1.

The display control circuit 62 includes a parking frame estimation unit 63 for estimating a longitudinal direction of a parking frame from at least two ground marks ($M_1$, $M_2$) shown in the camera image, for example, and a display switch unit 64 for switching images displayed on the display 53 depending on a relative angle between the longitudinal direction of the parking frame and the front-rear direction of the vehicle 1.

The display switch unit 64 switches from the bird's-eye image to an enlarged image showing a relative position between the ground coil 12 and the vehicle coil 22 on a larger scale than the bird's-eye image when an absolute value of the relative angle between the longitudinal direction of the parking frame and the front-rear direction of the vehicle 1 is a predetermined value or smaller. The display switch unit 64 displays the bird's-eye image generated by the image generation unit 61 on the display 53 when the absolute value of the relative angle between the longitudinal direction of the parking frame and the front-rear direction of the vehicle 1 is not the predetermined value or smaller. The display switch unit 64 displays the enlarged image on the display 53 when the absolute value of the relative angle between the longitudinal direction of the parking frame and the front-rear direction of the vehicle 1 is the predetermined value or smaller.

When a single image is displayed on the display 53, the display switch unit 64 only needs to switch the displayed image from the bird's-eye image to the enlarged image. When two or more different images are displayed with different display areas on the display 53, the display switch unit 64 may switch a degree of enlargement of the display area between the bird's-eye image and the enlarged image displayed. When the absolute value of the relative angle between the longitudinal direction of the parking frame and the front-rear direction of the vehicle 1 is the predetermined value or smaller, the display switch unit 64 may switch the degree of enlargement such that the enlarged image has a larger display area than the bird's-eye image.

While this embodiment illustrates the case in which the image controller 55 is installed in the vehicle 1, the image controller 55 may be installed outside the vehicle 1, such as in the power supply device 100. In such a case, the camera image may be acquired through the communication between the radio communication units 13 and 23 so as to control the image displayed on the display 53.

Figure 3A:
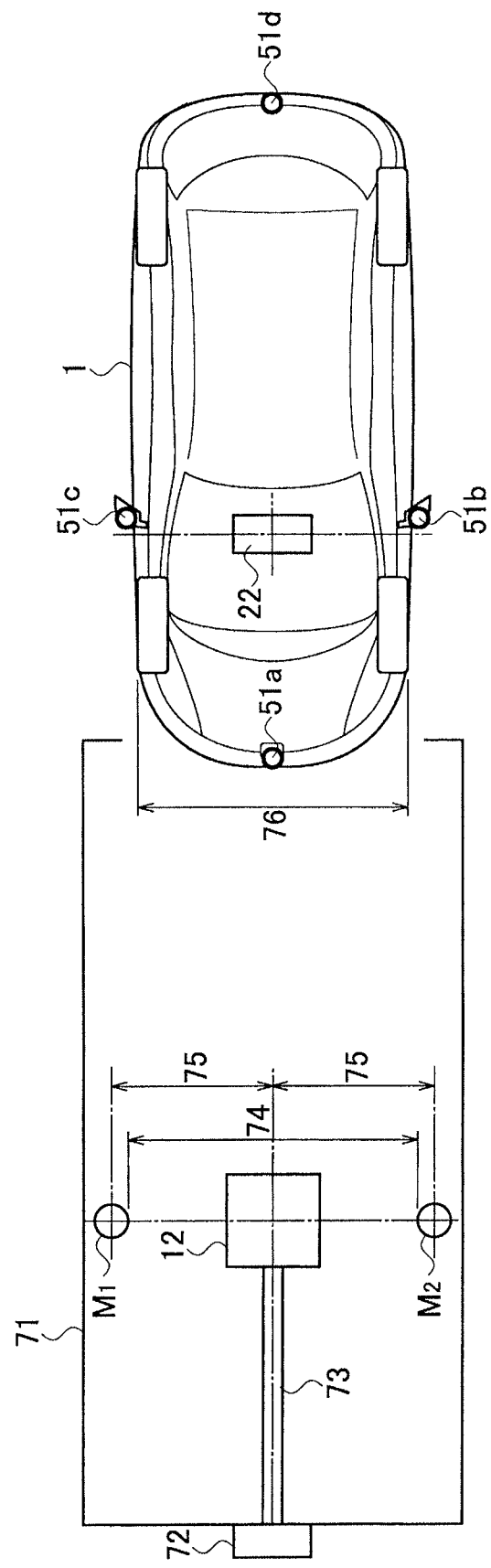
FIG. 3A is a top view illustrating forward parking of a vehicle 1 moving forward to enter a parking space equipped with a power supply device 100.

As shown in FIG. 3A, a parking frame 71 is provided on a road surface in the parking space, and the ground coil 12 and the ground marks ($M_1$, $M_2$) are arranged inside the parking frame 71. The ground coil 12 is connected with one end of a power source cable 73 extending in the longitudinal direction of the parking frame 71, and the other end of the power source cable 73 is connected to a power source box 72 placed on the outside of the parking frame 71. The power supply device 100 shown in FIG. 1 excluding the ground coil 12 and the ground marks ($M_1$, $M_2$) is housed in the power source box 72.

The center of the ground coil 12 is located in the middle of a line segment connecting the two ground marks ($M_1$, $M_2$). Distances 75 between the respective centers of the ground marks ($M_1$, $M_2$) and the center of the ground coil 12 are identical to each other. The ground marks ($M_1$, $M_2$) are arranged such that a distance 74 between the respective inner ends of the ground marks ($M_1$, $M_2$) is longer than a width 76 of the vehicle 1. This prevents the two ground marks ($M_1$, $M_2$) from being hidden by the vehicle 1 when the vehicle 1 enters the parking frame 71, so as to indicate the both ground marks ($M_1$, $M_2$) in the camera image of the circumference of the vehicle 1 captured. The line segment connecting the ground marks ($M_1$, $M_2$) is perpendicular to the longitudinal direction of the parking frame 71, which is the entering direction of the vehicle 1.

The vehicle coil 22 is mounted on the base of the vehicle 1. When the vehicle 1 stops at a predetermined stop position in the parking space (the parking frame 71), the vehicle coil 22 is positioned immediately above the ground coil 12. Wheel chocks, which are not shown in either FIG. 3A or FIG. 3B, may be provided at positions with which the wheels of the vehicle 1 stopping at the predetermined stop position are brought into contact.

The vehicle 1 is equipped with cameras (51a, 51b, 51c, and 51d) at a front end, both side-view mirrors, and a rear end of the vehicle 1 for capturing images of the circumference of the vehicle 1. The images captured by the cameras (51a, 51b, 51c, and 51d) are transferred to the image controller 55.

As shown in FIG. 3B, this embodiment also employs a configuration for backward parking which is similar to the configuration for forward parking illustrated in FIG. 3A. The configuration for backward parking differs from the configuration for forward parking in that the vehicle coil 22 is positioned closer to the side on which the vehicle 1 enters than the case shown in FIG. 3A when the vehicle 1 stops at the predetermined stop position.

Figure 4A:
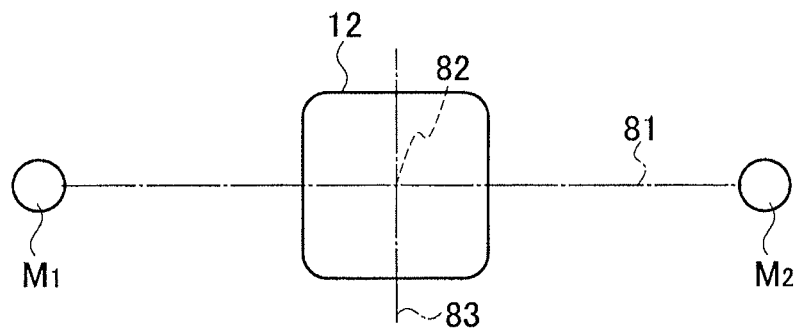
FIG. 4A is a view showing a first example of ground marks (M1, M2).
Figure 4B:
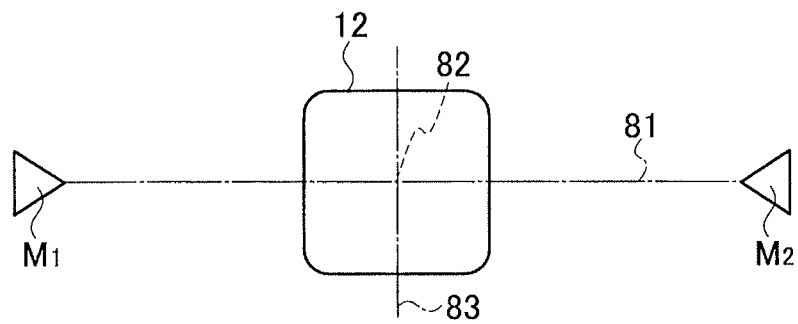
FIG. 4B is a view showing a second example of ground marks (M1, M2).
Figure 4C:
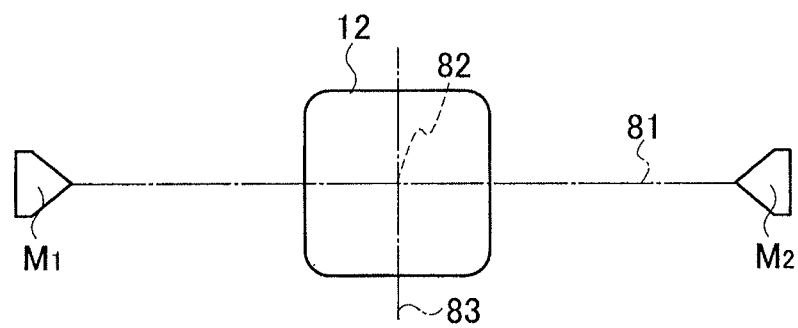
FIG. 4C is a view showing a third example of ground marks (M1, M2).
Figure 4D:
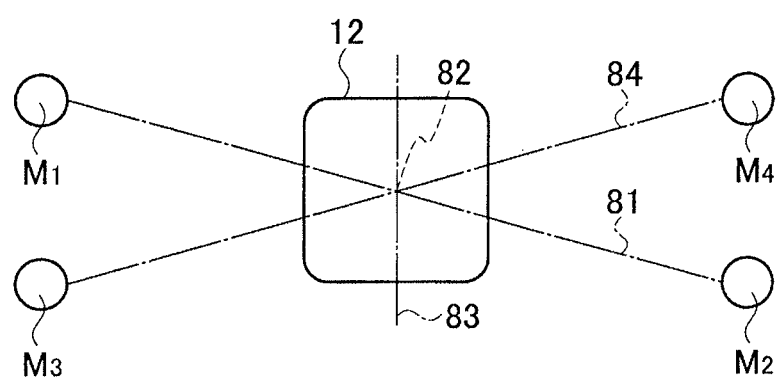
FIG. 4D is a view showing a fourth example of ground marks (M1, M2, M3, M4).
Figure 4E:
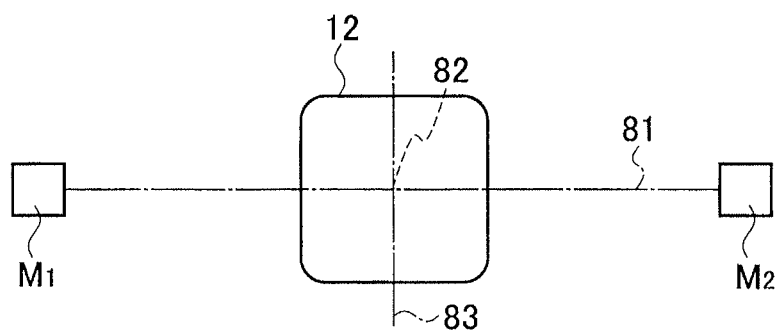
FIG. 4E is a view showing a fifth example of ground marks (M1, M2).
Figure 4F:
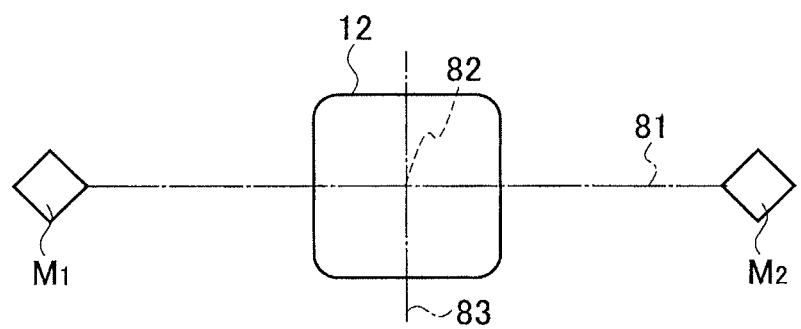
FIG. 4F is a view showing a sixth example of ground marks (M1, M2).
Figure 4G:
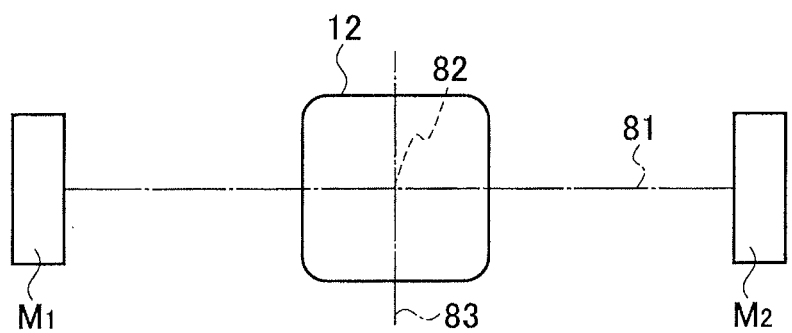
FIG. 4G is a view showing a seventh example of ground marks (M1, M2).

Examples of the ground marks ($M_1$, $M_2$) are described below with reference to FIG. 4A to FIG. 4G. The shape of the ground marks ($M_1$, $M_2$) may be any of a circular shape as shown in FIG. 4A, a triangular shape as shown in FIG. 4B, a pentagonal shape as shown in FIG. 4C, a square shape as shown in FIG. 4E, a rhombic shape as shown in FIG. 4F, and a rectangular shape as shown in FIG. 4G. The number of the ground marks ($M_1$, $M_2$) is not limited to two. FIG. 4D illustrates a case using four ground marks ($M_1$, $M_2$, $M_3$, $M_4$) in which two pairs of the ground marks ($M_1$ and $M_2$, $M_3$ and $M_4$) are provided. The center of the ground coil 12 is located at a point of intersection 82 of the line segment 81 connecting the ground marks ($M_1$, $M_2$) and a straight line 84 connecting the ground marks ($M_3$, $M_4$).

This embodiment is illustrated with the case in which the center 82 of the ground coil 12 is located in the middle of the straight line 81 connecting the ground marks ($M_1$, $M_2$), but is not limited to this case. Although not shown in the drawings, the center of the ground coil 12 may be located at a position away from the middle of the straight line 81 connecting the ground marks ($M_1$, $M_2$) by a predetermined distance in the direction perpendicular to the straight line 81. For example, when the ground marks ($M_1$, $M_2$) are shifted from the center of the ground coil 12 by a predetermined distance toward the side on which the vehicle 1 enters, the cameras (51a to 51d) can detect the ground marks ($M_1$, $M_2$) earlier. Further, the direction of the cameras (51a to 51d) for detecting the ground marks ($M_1$, $M_2$) approximates to the direction perpendicular to the road surface, so as to improve the accuracy of detecting the positions of the ground marks ($M_1$, $M_2$). For example, each of the shapes of the ground marks ($M_1$, $M_2$) illustrated in FIG. 4A to FIG. 4G may be preliminarily matched with a predetermined distance, and the image controller 55 may include a circuit which distinguishes the shapes of the ground marks ($M_1$, $M_2$), so as to acquire a necessary predetermined distance from the middle of the straight line 81 to the center of the ground coil 12 according to the corresponding shape of the ground marks ($M_1$, $M_2$).

The respective cameras (51a to 51d) capture images on the front side, the left side, the right side, and the rear side of the vehicle 1. The image generation unit 61 joins bird's-eye images generated from the respective camera images to generate a single bird's-eye image, which is an around view monitoring (AVM) top view, surrounding all sides of the vehicle 1, as shown in FIG. 5A.

Figure 5A:
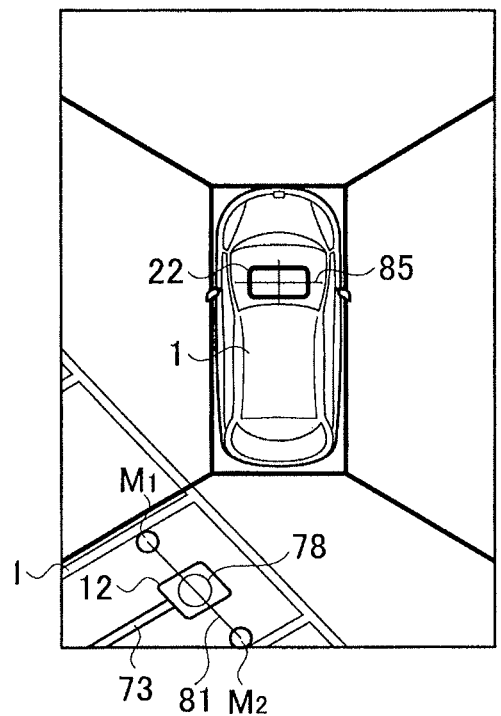
FIG. 5A is a view showing a bird's-eye image, which is an around view monitoring (AVM) top view, displayed on a display 53 at an early stage of a parking assistance operation.

FIG. 5A illustrates the case of backward parking in which the vehicle 1 is moving backward to the parking space located behind the vehicle 1 and provided with the ground coil 12. Since the absolute value of the relative angle between the longitudinal direction of the parking frame 71 and the front-rear direction of the vehicle 1 is not the predetermined value or smaller in the state shown in FIG. 5A, the display control circuit 62 displays the bird's-eye image generated by the image generation circuit 61 shown in FIG. 5A on the display 53. The AVM top view presented can provide the user with the parking assistance so as to focus on parking the vehicle 1 in the parking space. The user thus can operate the steering wheel appropriately referring to the AVM top view.

Figure 5B:
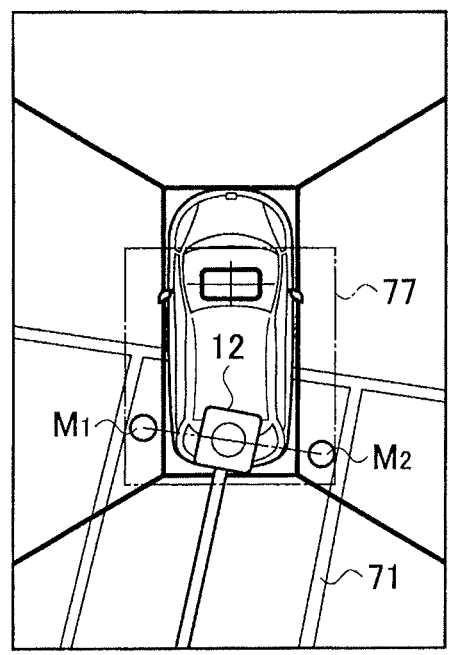
FIG. 5B is a view showing a bird's-eye image (an AVM top view) displayed on the display 53 in which the vehicle 1 is moving closer to the parking space than in FIG. 5A to decrease a relative angle of the vehicle 1 to a parking frame 71.
Figure 5C:
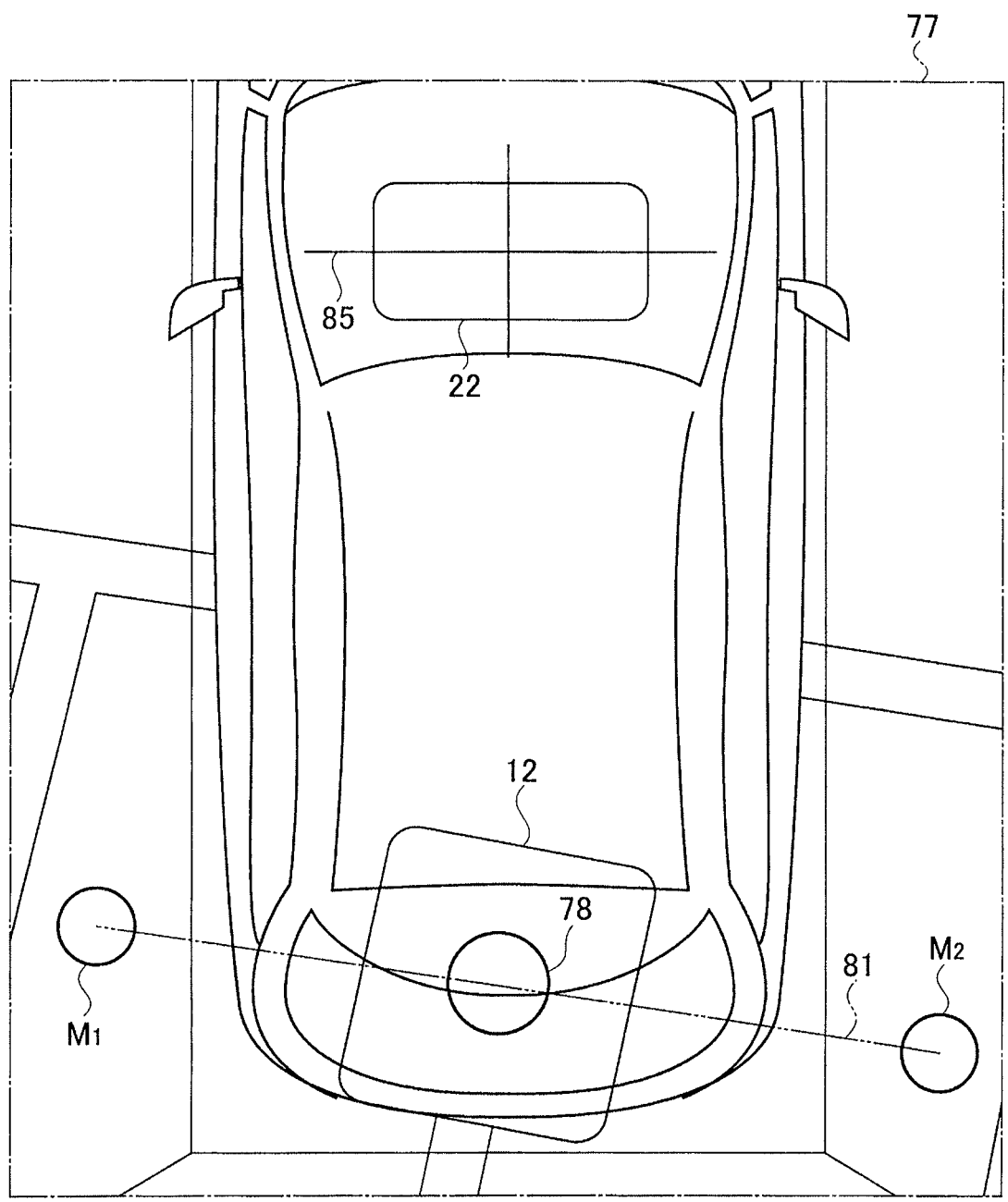
FIG. 5C is a view showing an enlarged image of a relative position between a ground coil 12 and a vehicle coil 22 on a larger scale than the bird's-eye image shown in FIGS. 5A and 5B.

When the relative angle between the parking frame 71 and the vehicle 1 is decreased to a predetermined range as the operation of parking the vehicle 1 proceeds, as shown in FIG. 5B, the user does not need to keep operating the steering wheel. The user thus can concentrate on the coil alignment while moving the vehicle 1 in the front-back direction. The image controller 55 determines whether the absolute value of the relative angle of the longitudinal direction of the parking frame 71 estimated by the parking frame estimation unit 63 to the front-rear direction of the vehicle 1 is the predetermined value or smaller. When the absolute value of the relative angle between the longitudinal direction of the parking frame 71 and the front-rear direction of the vehicle 1 is determined to be the predetermined value or smaller, the display switch unit 64 switches from the bird's-eye image to the enlarged image showing the relative position between the ground coil 12 and the vehicle coil 22 on a larger scale than the bird's-eye image, as shown in FIG. 5C. The user thus can concentrate on the alignment of the vehicle coil 22 with the ground coil 12. Accordingly, the parking assistance for the wireless power supply can provide the user with the necessary image information (a means of easily recognizing the relative position between the ground coil and the vehicle coil) at the right time that the user requires.

As shown in FIG. 5A and FIG. 5B, the display control circuit 62 displays computer graphic (CG) images of the following elements superposed on the bird's-eye image:

(1) Frames indicating outlines of the vehicle coil 22 and the ground coil 12;

(2) Two line segments 85 extending in the vehicle width direction and the front-rear direction of the vehicle 1 and intersecting at the center of the vehicle coil 22;

(3) The ground marks ($M_1$, $M_2$) confirmed by the display control circuit 62; and (4) The line segment 81 connecting the ground marks ($M_1$, $M_2$).

For example, the display control circuit 62 displays the enlarged image of the vehicle 1 in a region including the vehicle coil 22 and the rear side of the vehicle coil 22 during backward parking, as shown in FIG. 5C. A region surrounded by the dashed-dotted line 77 in FIG. 5B corresponds to the region of the enlarged image shown in FIG. 5C. The display control circuit 62 displays the enlarged image of the vehicle 1 in a region including the vehicle coil 22 and the front side of the vehicle coil 22 during forward parking. Accordingly, the relative position between the vehicle coil 22 and the ground coil 12 can be displayed in the enlarged image on a larger scale than the bird's-eye image shown in FIG. 5A and FIG. 5B.

The parking frame estimation unit 63 calculates the line segment 81 connecting the ground marks ($M_1$, $M_2$) according to the ground marks ($M_1$, $M_2$), and estimates the longitudinal direction of the parking frame 71 perpendicular to the line segment 81 according to the line segment 81.

The display switch unit 64 switches from the bird's-eye image as shown in FIG. 5B to the enlarged image as shown in FIG. 5C when an absolute value of a relative angle of the straight line 81 connecting the ground marks ($M_1$, $M_2$) to the straight line 85 passing through the center of the vehicle coil 22 and parallel to the vehicle width direction of the vehicle 1, is a predetermined value or smaller.

Figure 9A:
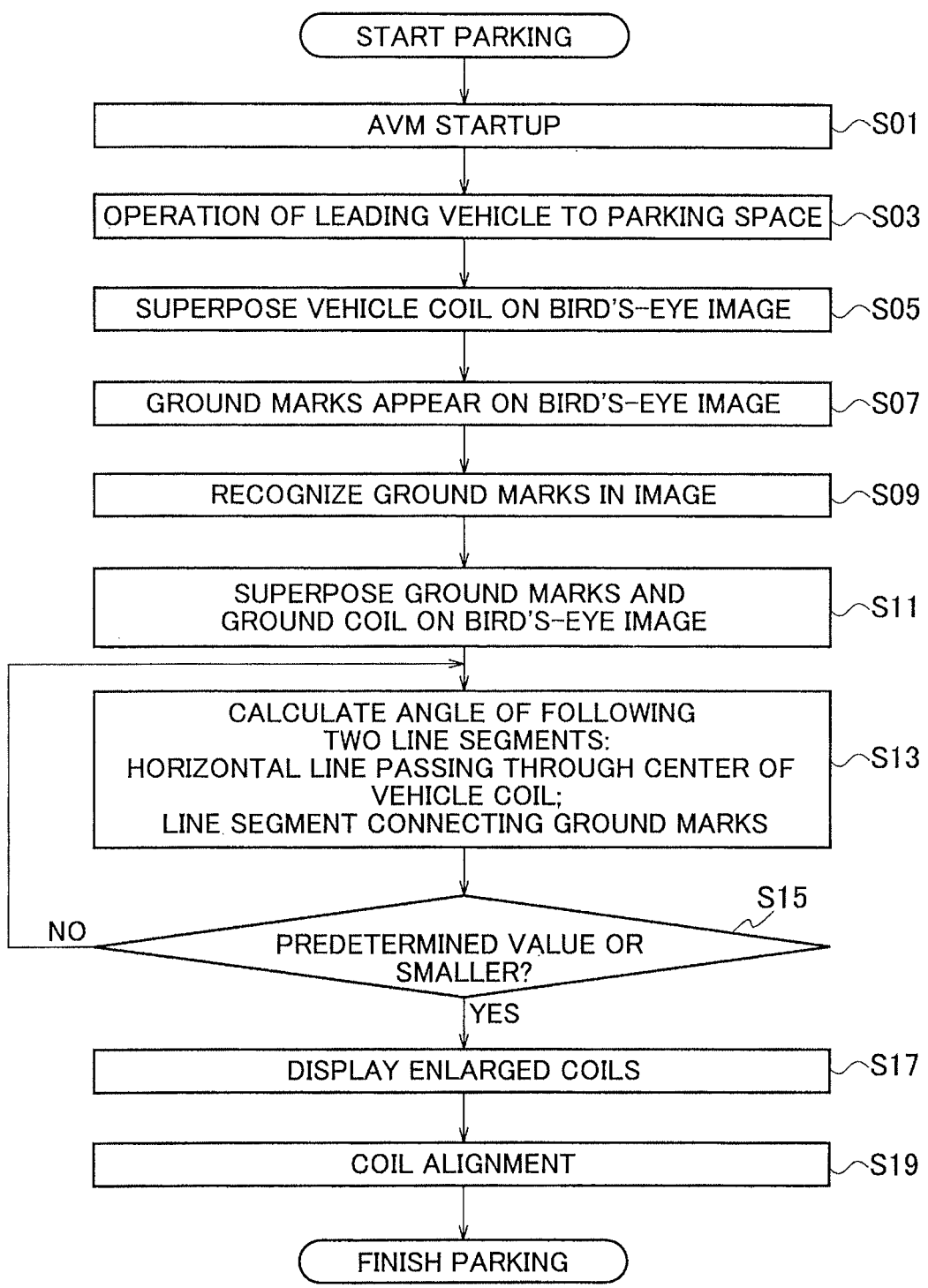
FIG. 9A is a flowchart illustrating a parking assistance method according to a first embodiment.

A parking assistance method using the parking assistance device shown in FIG. 1 is illustrated below with reference to FIG. 9A. The process in the flowchart shown in FIG. 9A starts as the parking assistance starts, and ends when the vehicle 1 is parked at a target parking position and a gearshift is shifted to a position for parking.

In step S01, the parking assistance device 300 is started up. The process proceeds to step S03 to provide the user with parking assistance information. The parking assistance information includes image information. The image controller 55 generates a bird's-eye image as shown in FIG. 6A from camera images captured by the cameras (51a to 51d) installed in the vehicle 1, and displays the bird's-eye image as the image information on the display 53.

The process proceeds to step S05, and the image controller 55 displays a CG image of the vehicle coil 22 superposed on the bird's-eye image. In particular, the image controller 55 displays CG images of the following elements superposed on the bird's-eye image:

The frame indicating the outline of the vehicle coil 22; and

The two line segments 85 extending in the vehicle width direction and the front-rear direction of the vehicle 1 and intersecting at the center of the vehicle coil 22.

The process proceeds to step S07, and the image controller 55 recognizes the presence of the paired ground marks ($M_1$, $M_2$) shown in the bird's-eye image. The process then proceeds to step S09, and the image controller 55 confirms the image of the two ground marks ($M_1$, $M_2$). In particular, the image controller 55 determines the shape of the ground marks ($M_1$, $M_2$) (a circular shape, a triangular shape, a rectangular shape, etc.) and a central position which is a relative position to the vehicle 1.

The process proceeds to step S11, and the image controller 55 obtains the central position of the ground coil 12 according to the ground marks ($M_1$, $M_2$), and displays a CG image of the ground coil 12 superposed on the bird's-eye image. In particular, the image controller 55 displays CG images of the following elements superposed on the bird's-eye image:

The ground marks ($M_1$, $M_2$) confirmed by the display control circuit 62;

The line segment 81 connecting the ground marks ($M_1$, $M_2$);

The frame indicating the outline of the ground coil 12;

A line segment vertical to the line segment 81 intersecting at the center of the ground coil 12 (the line segment 81); and A chargeable area 78 of the ground coil 12.

The wireless charge is available when the center of the vehicle coil 22 is positioned within the chargeable area 78 of the ground coil 12.

The process proceeds to step S13, and the display control circuit 62 calculates the relative angle of the straight line 81 connecting the ground marks ($M_1$, $M_2$) to the straight line 85 passing through the center of the vehicle coil 22 and parallel to the vehicle width direction of the vehicle 1.

The process proceeds to step S15, and the display control circuit 62 determines whether the absolute value of the relative angle is a predetermined value (for example, five degrees) or smaller. When the absolute value of the relative angle is the predetermined value or smaller (YES in step S15), the operation on the steering wheel is almost completed, so as to start the coil alignment while moving the vehicle 1 in the front-rear direction. The process then proceeds to step S17, and the image information presented on the display 53 is switched from the bird's-eye image (FIG. 5B) to the enlarged image (FIG. 5C), so as to display the enlarged image on the display 53. This facilitates the coil alignment since the relative position of the coils is displayed on an enlarged scale.

When the absolute value of the relative angle is not the predetermined value or smaller (NO in step S15), the operation on the steering wheel needs to be continued, and the process returns to step S13 to keep displaying the bird's-eye image and monitoring a change of the absolute value of the relative angle.

In step S19, the user moves the vehicle 1 in the front-rear direction to align the coils. The user stops the vehicle 1 when the center of the vehicle coil 22 is positioned within the chargeable range 78 of the ground coil 12 and turns off the ignition of the vehicle 1. The parking process thus ends through the steps described above.

The first embodiment described above can achieve the following effects.

When the absolute value of the relative angle of the longitudinal direction of the parking frame 71 to the front-rear direction of the vehicle 1 is the predetermined value or smaller, the bird's-eye image is switched to the enlarged image showing the relative position of the ground coil 12 and the vehicle coil 22 on a larger scale than the bird's-eye image. The bird's-eye image is first displayed in order to focus on the parking assistance to lead the vehicle 1 to the parking space. When the relative angle of the parking frame 71 to the vehicle 1 is decreased to a predetermined range, the operation on the steering wheel does not need to be continued. The bird's-eye image is then switched to the enlarged image showing the positions of the ground coil 12 and the vehicle coil 22 on a larger scale. The user thus can concentrate on the alignment of the vehicle coil 22 with the ground coil 12. Accordingly, the parking assistance for the wireless power supply can provide the user with the necessary image information (a means of easily recognizing the relative position between the ground coil 12 and the vehicle coil 22) at the right time that the user requires.

The longitudinal direction of the parking frame 71 is estimated according to the at least two ground marks ($M_1$, $M_2$) shown in the camera image. The use of the ground marks allows the accurate estimation of the longitudinal direction of the parking frame 71 regardless of whether the parking frame 71 itself is recognized from the camera image. The parking frame 71 is not necessarily a closed frame entirely surrounding the parking space but may be partly open. For example, the parking frame 71 may be markers indicating four corners of a rectangular parking space, or may be markers indicating opposed two sides of a rectangular parking space, such as two sides in the vehicle width direction or two sides in the front-rear direction of the parking space. Accordingly, the longitudinal direction of the parking frame 71 can be estimated regardless of whether the parking frame 71 itself is recognized from the camera image when the ground marks ($M_1$, $M_2$) are shown in the camera image so as to recognize the positions of the ground marks ($M_1$, $M_2$).

The bird's-eye image (FIG. 5B) is switched to the enlarged image (FIG. 5C) when the absolute value of the relative angle of the straight line 81 connecting the ground marks ($M_1$, $M_2$) to the straight line 85 passing through the center of the vehicle coil 22 and parallel to the vehicle width direction of the vehicle 1, is the predetermined value (for example, five degrees) or smaller. The straight line 81 connecting the ground marks ($M_1$, $M_2$) is perpendicular to the longitudinal direction of the parking frame 71. The positioning adjustment of the vehicle 1 to the parking space is almost completed when the absolute value of the relative angle is the predetermined value or smaller, and the user only needs to move the vehicle 1 in the front-rear direction. The image is switched to the enlarged image at this point so as to align the coils. Accordingly, the image information that the user requires can be provided at the right time that the user requires.

Second Embodiment

A second embodiment illustrates an example regarding the operation of switching from the bird's-eye image to the enlarged image under an additional condition, added to the example of the first embodiment, that the ground marks ($M_1$, $M_2$) are shown in both right and left regions of the bird's-eye image. A hardware configuration of a wireless power supply system of the second embodiment is the same as that of the first embodiment shown in FIG. 1, and overlapping illustrations and explanations are not repeated in this embodiment.

Figure 6:
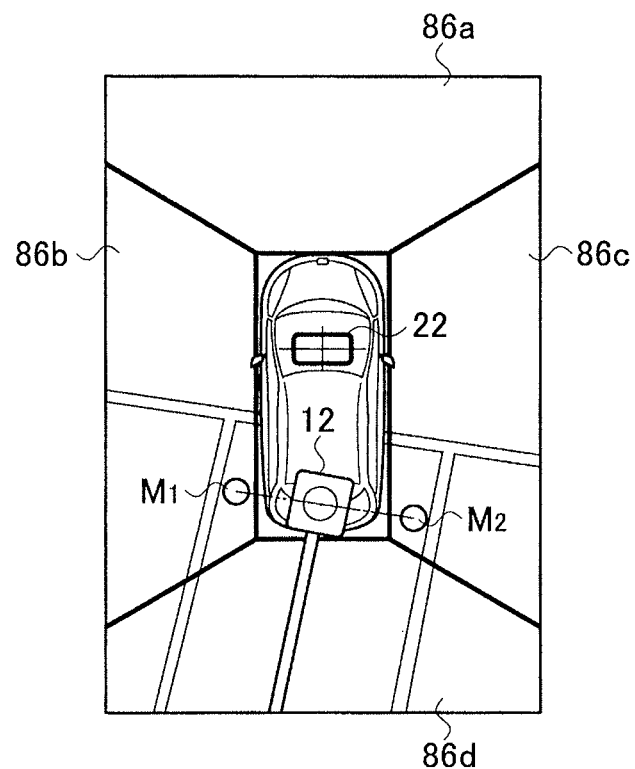
FIG. 6 is a view showing a bird's-eye image (an AVM top view) displayed on the display 53 divided into four regions (86a to 86d) corresponding to cameras (51a to 51d).

As shown in FIG. 6, the bird's-eye image (the AVM top view) displayed on the display 53 is divided into four regions (a front-side region 86a, a left-side region 86b, a right-side region 86c, and a rear-side region 86d) corresponding to the respective cameras (51a to 51d). The front-side region 86a corresponds to the camera 51a provided at the front end of the vehicle 1. The left-side region 86b corresponds to the camera 51b provided at the left side-view mirror of the vehicle 1. The right-side region 86c corresponds to the camera 51c provided at the right side-view mirror of the vehicle 1. The rear-side region 86d corresponds to the camera 51d provided at the rear end of the vehicle 1.

The display switch unit 64 switches from the bird's-eye image (FIG. 5B) to the enlarged image (FIG. 5C) showing the relative position between the ground coil 12 and the vehicle coil 22 on a larger scale than the bird's-eye image when the absolute value of the relative angle between the longitudinal direction of the parking frame 71 and the front-rear direction of the vehicle 1 is a predetermined value or smaller, and the ground marks ($M_1$, $M_2$) are shown in both the right-side region 86c and the left-side region 86b of the bird's-eye image.

For example, when the vehicle 1 and the parking frame 71 are separated by a distance without overlapping each other, and the absolute value of the relative angle between the longitudinal direction of the parking frame 71 and the front-rear direction of the vehicle 1 is the predetermined value or smaller, the user needs to bring the vehicle 1 closer to the parking space while confirming the safety around the vehicle 1, prior to the coil alignment. The image information for facilitating the coil alignment is preferably presented after the vehicle 1 sufficiently comes close to the parking frame 71.

The display control circuit 62 determines that the vehicle 1 sufficiently comes close to the parking frame 71 when the ground marks ($M_1$, $M_2$) are shown in both the right-side region 86c and the left-side region 86b of the bird's-eye image. The display switch unit 64 switches from the bird's-eye image (FIG. 5B) to the enlarged image (FIG. 5C) when the conditions that the absolute value of the relative angle between the longitudinal direction of the parking frame 71 and the front-rear direction of the vehicle 1 is the predetermined value or smaller and that the ground marks ($M_1$, $M_2$) are shown in both the right-side region 86c and the left-side region 86b of the bird's-eye image are both satisfied.

Figure 9B:
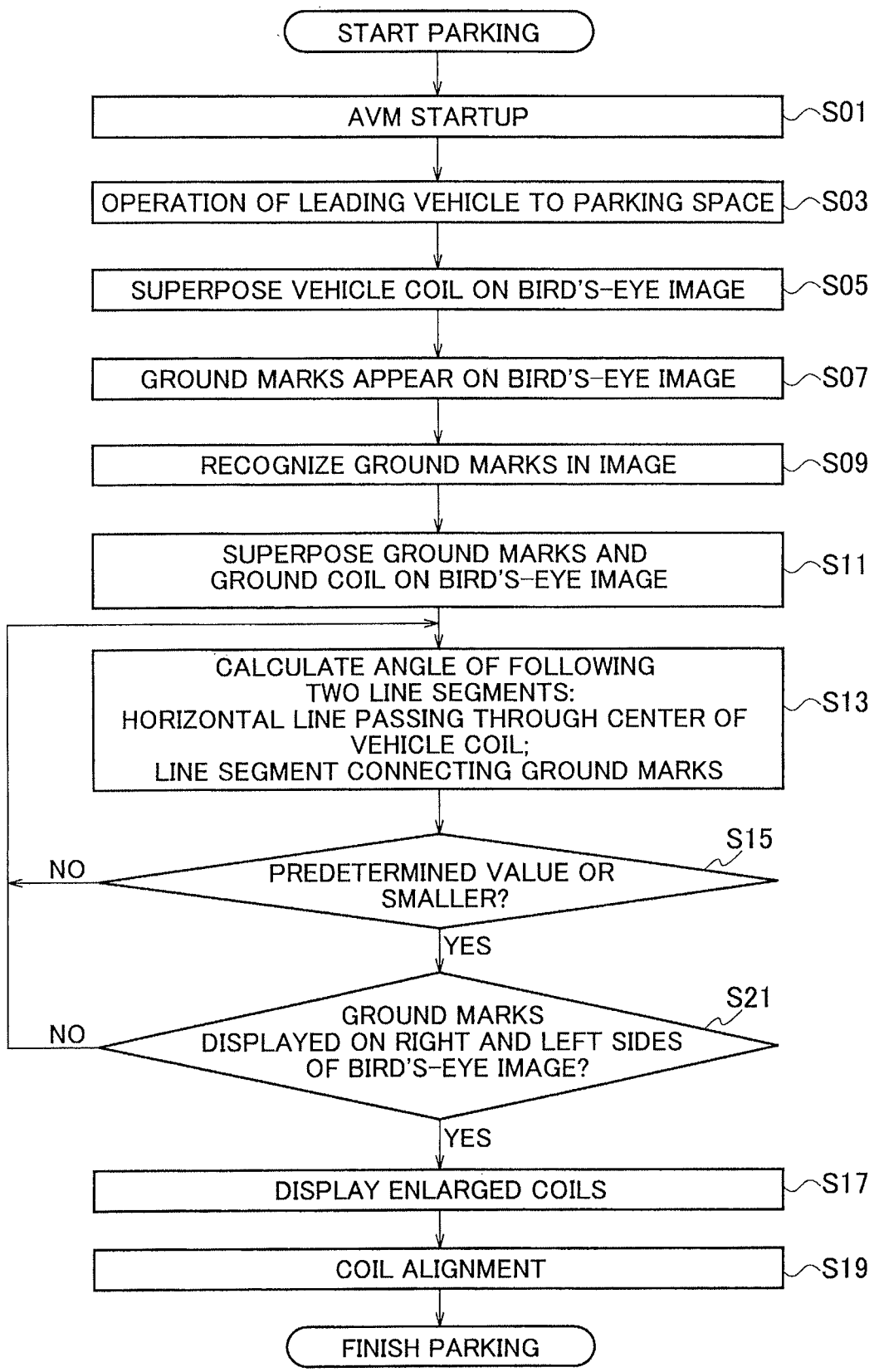
FIG. 9B is a flowchart illustrating a parking assistance method according to a second embodiment.

A parking assistance method according to the second embodiment is illustrated below with reference to FIG. 9B. The process in the flowchart shown in FIG. 9B further includes step S21 between step S15 and step S17 shown in FIG. 9A. The other steps shown in FIG. 9B are the same as those in FIG. 9A, and overlapping explanations are not repeated below.

When the absolute value of the relative angle between the longitudinal direction of the parking frame 71 and the front-rear direction of the vehicle 1 is the predetermined value or smaller (YES in step S15), the process proceeds to step S21. When the absolute value of the relative angle is not the predetermined value or smaller (NO in step S15), the process returns to step S13.

In step S21, the display control circuit 62 determines whether the ground mark $M_1$ and the ground mark $M_2$ are respectively shown in the left-side region 86b and the right-side region 86c of the bird's-eye image, as shown in FIG. 6.

When the determination is a positive result in step S21, the operation on the steering wheel is almost completed, so as to start the coil alignment while moving the vehicle 1 in the front-rear direction. The process then proceeds to step S17, and the bird's-eye image (FIG. 5B) is switched to the enlarged image (FIG. 5C) so as to display the enlarged image on the display 53. This facilitates the coil alignment since the relative position of the coils is displayed on an enlarged scale. When the determination is a negative result in step S21, the process returns to step S13.

As described above, the bird's-eye image is switched to the enlarged image when the absolute value of the relative angle between the longitudinal direction of the parking frame 71 and the front-rear direction of the vehicle 1 is the predetermined value or smaller, and the ground marks ($M_1$, $M_2$) are shown in both the right-side region 86c and the left-side region 86b of the bird's-eye image. Since the images are switched in the state in which the vehicle 1 comes closer to a target parking position, the necessary image information can be presented at the point contributing to easier coil alignment.

Third Embodiment

A third embodiment illustrates an example, similar to the example of the second embodiment, regarding the operation of switching from the bird's-eye image to the enlarged image under a condition that the vehicle 1 sufficiently comes close to the parking frame 71. In particular, the third embodiment is an example regarding the operation of switching from the bird's-eye image to the enlarged image under an additional condition, added to the example of the first embodiment, that a sub-coil mounted on the vehicle 1 detects electric power from the ground coil 12. A hardware configuration of a wireless power supply system of the third embodiment is the same as that of the first embodiment shown in FIG. 1, except for sub-coils additionally installed in the vehicle 1, and overlapping illustrations and explanations are not repeated in this embodiment.

Figure 7:
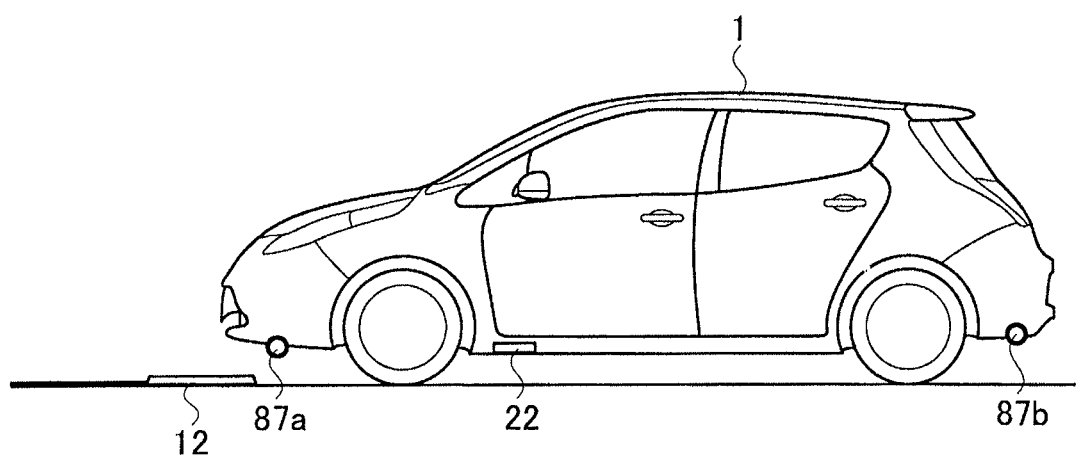
FIG. 7 is a side-view showing an arrangement example of sub-coils (87a, 87b) mounted on the vehicle 1.

An arrangement example of sub-coils (87a, 87b) mounted on the vehicle 1 is described below with reference to FIG. 7. Each of the sub-coils (87a, 87b) is made of a conductive wire and has a smaller size and a smaller wound number than the vehicle coil 22 and the ground coil 12. The sub-coil 87a is provided at a front end of the base of the vehicle 1, and the sub-coil 87b is provided at a rear end of the base of the vehicle 1. As shown in FIG. 7, when the vehicle 1 makes forward parking by moving forward to approach the ground coil 12, the sub-coil 87a detects electric power from the ground coil 12 prior to the vehicle coil 22. The vehicle 1 thus can be determined to come closer to the parking space due to the detection by the sub-coil 87a. When the vehicle 1 makes backward parking by moving backward to approach the ground coil 12, the sub-coil 87b detects electric power from the ground coil 12.

The display switch unit 64 switches from the bird's-eye image to the enlarged image when the absolute value of the relative angle between the longitudinal direction of the parking frame 71 and the front-rear direction of the vehicle 1 is a predetermined value or smaller, and either of the sub-coils (87a, 87b) mounted on the vehicle 1 detects electric power from the ground coil 12.

Figure 9C:
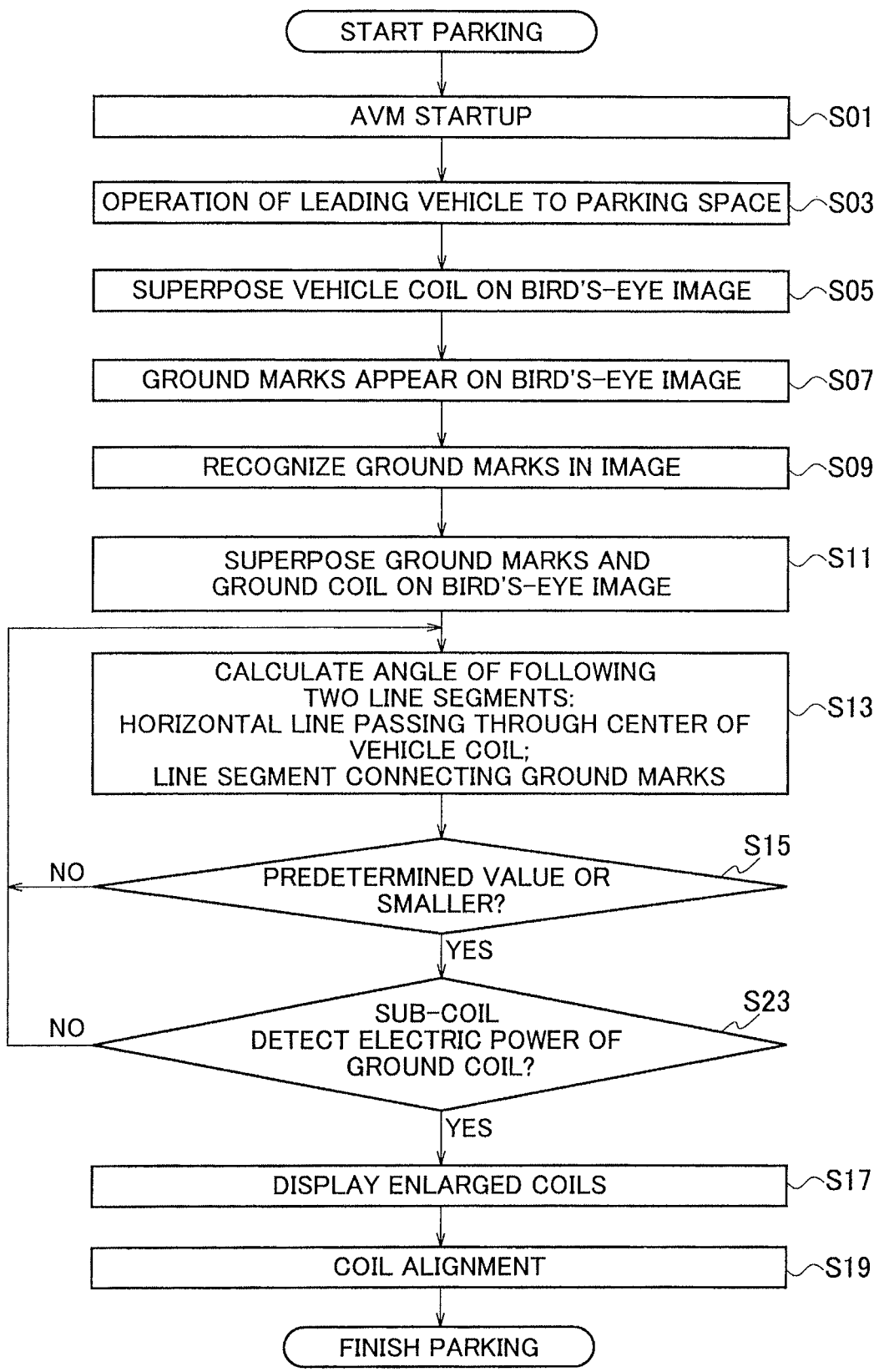
FIG. 9C is a flowchart illustrating a parking assistance method according to a third embodiment.

A parking assistance method according to the third embodiment is illustrated below with reference to FIG. 9C. The process in the flowchart shown in FIG. 9C further includes step S23 between step S15 and step S17 shown in FIG. 9A. The other steps shown in FIG. 9C are the same as those in FIG. 9A, and overlapping explanations are not repeated below.

When the absolute value of the relative angle between the longitudinal direction of the parking frame 71 and the front-rear direction of the vehicle 1 is the predetermined value or smaller (YES in step S15), the process proceeds to step S23. When the absolute value of the relative angle is not the predetermined value or smaller (NO in step S15), the process returns to step S13.

In step S23, the display control circuit 62 determines whether either of the sub-coils (87a, 87b) mounted on the vehicle 1 shown in FIG. 7 detects electric power from the ground coil 12.

When the determination is a positive result in step S23, the operation on the steering wheel is almost completed, so as to start the coil alignment while moving the vehicle 1 in the front-rear direction. The process then proceeds to step S17, and the display switch unit 64 switches from the bird's-eye image to the enlarged image so as to display the enlarged image on the display 53. This facilitates the coil alignment since the relative position of the coils is displayed on an enlarged scale. When the determination is a negative result in step S23, the process returns to step S13.

According to the third embodiment as described above, the image information for facilitating the recognition of the relative position between the ground coil 12 and the vehicle coil 22 can be presented at the point when the vehicle 1 sufficiently comes close to the parking space and the relative angle between the vehicle 1 and the parking frame 71 is sufficiently decreased.

Fourth Embodiment

A fourth embodiment illustrates an example regarding the operation of determining that the absolute value of the relative angle between the longitudinal direction of the parking frame 71 and the front-rear direction of the vehicle 1 is a predetermined value or smaller when the steering wheel provided in the vehicle 1 is in a neutral position. The fourth embodiment uses the ground marks ($M_1$, $M_2$) and the straight line 81 connecting the ground marks ($M_1$, $M_2$) for detecting the position of the ground coil 12, not for estimating the longitudinal direction of the parking frame 71. A hardware configuration of a wireless power supply system of the fourth embodiment is the same as that of the first embodiment shown in FIG. 1, and overlapping illustrations and explanations are not repeated in this embodiment.

The display switch unit 64 switches from the bird's-eye image to the enlarged image when the steering wheel provided in the vehicle 1 is in a neutral position. As used herein, the phrase "the steering wheel in a neutral position" refers to a state in which an absolute value of a steering angle of the steering wheel is a predetermined steering reference value (for example, three degrees) or smaller. The phrase also refers to a state in which an absolute value of a turning angle of the wheels is a predetermined turning reference value or smaller.

Figure 9D:
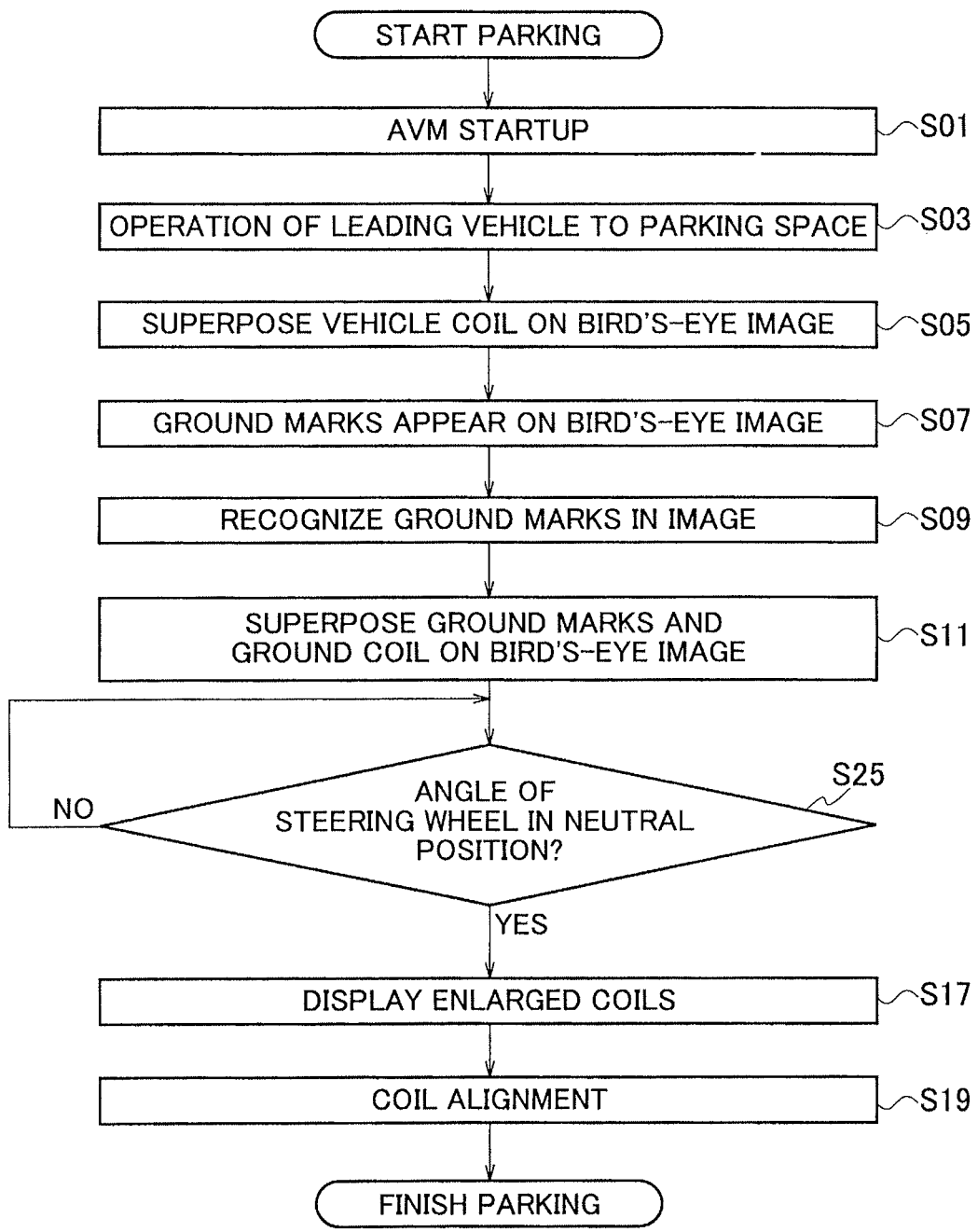
FIG. 9D is a flowchart illustrating a parking assistance method according to a fourth embodiment.

A parking assistance method according to the fourth embodiment is illustrated below with reference to FIG. 9D. The process in the flowchart shown in FIG. 9D includes step S25 instead of step S13 and step S15 shown in FIG. 9A. The other steps shown in FIG. 9D are the same as those in FIG. 9A, and overlapping explanations are not repeated below.

In step S25, the display control circuit 62 monitors the steering wheel of the vehicle 1 until the steering wheel is located in the neutral position. When the determination is a positive result in step S25, the operation on the steering wheel is almost completed, so as to start the coil alignment while moving the vehicle 1 in the front-rear direction. The process then proceeds to step S17, and the display switch unit 64 switches from the bird's-eye image to the enlarged image so as to display the enlarged image on the display 53. This facilitates the coil alignment since the relative position of the coils is displayed on an enlarged scale.

According to the fourth embodiment as described above, the enlarged image for facilitating the coil alignment can be presented at the point when the positioning adjustment of the vehicle 1 to the parking space is almost completed and the user only needs to move the vehicle 1 in the front-rear direction.

Fifth Embodiment

A fifth embodiment exemplifies an example regarding the operation of determining that the absolute value of the relative angle between the longitudinal direction of the parking frame 71 and the front-rear direction of the vehicle 1 is a predetermined value or smaller when estimated course lines displayed on the display 53 denote straight movement. The fifth embodiment uses the ground marks ($M_1$, $M_2$) and the straight line 81 connecting the ground marks ($M_1$, $M_2$) for detecting the position of the ground coil 12, not for estimating the longitudinal direction of the parking frame 71. A hardware configuration of a wireless power supply system of the fifth embodiment is the same as that of the first embodiment shown in FIG. 1, and overlapping illustrations and explanations are not repeated in this embodiment.

Figure 8A:
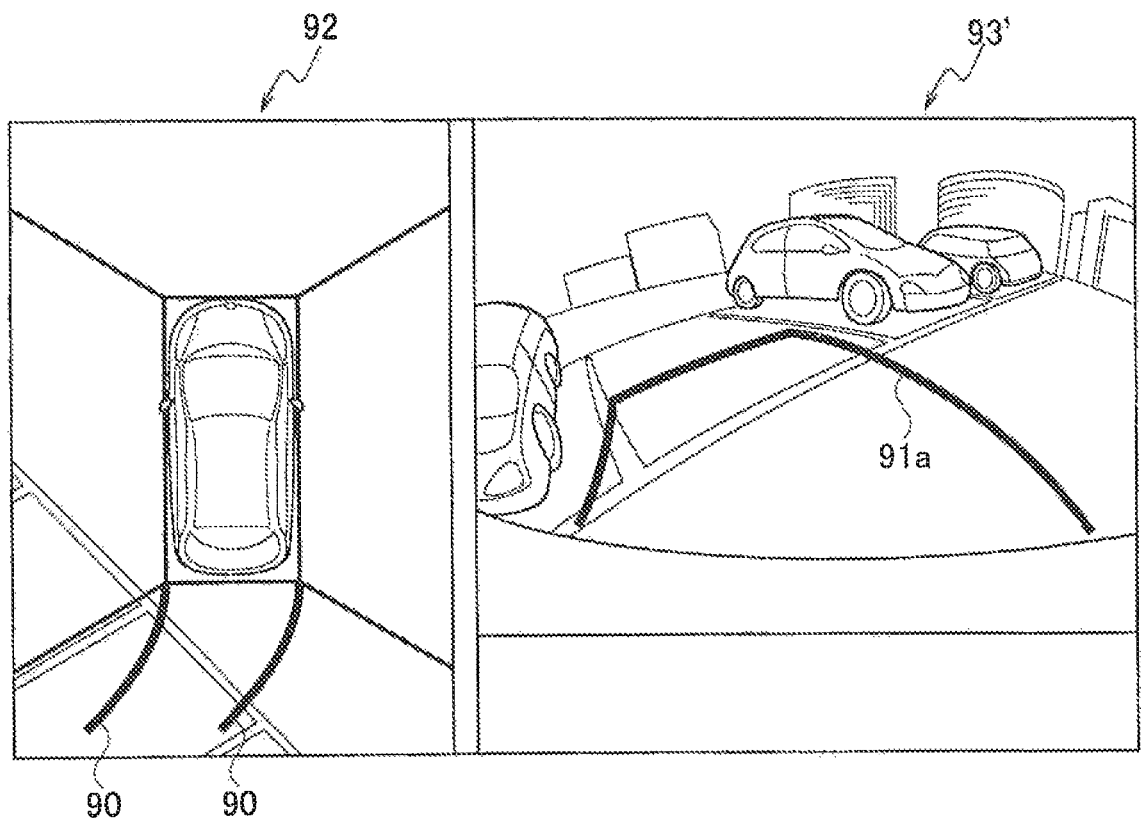
FIG. 8A is a view showing estimated course lines (90, 91a) superposed on a bird's-eye image 92 and a camera image 93'.
Figure 8B:
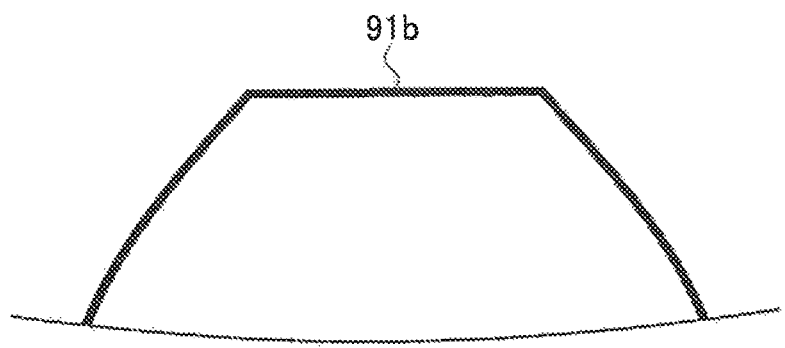
FIG. 8B is a view showing estimated course lines 91b denoting straight movement superposed on the camera image 93'.

The image controller 55 estimates a course of the vehicle 1 according to a steering angle of the steering wheel or a turning angle of the wheels of the vehicle 1, and displays lines (estimated course lines) (90, 91*a*) indicating the estimated course of the vehicle 1 superposed on a bird's-eye image 92 or a camera image 93' captured by the camera 51*d*, as shown in FIG. 8A or FIG. 8B. The estimated course lines (90, 91*a*) extend from rear ends or front ends of both side surfaces of the vehicle 1. As the absolute value of the turning angle or the steering angle is smaller, the curvature of the respective estimated course lines decreases to approximate to a straight line. A shown in FIG. 8B, when the estimated course lines 91*b* indicate straight movement, the steering angle or the turning angle can be determined to be approximately zero degrees.

Figure 9E:
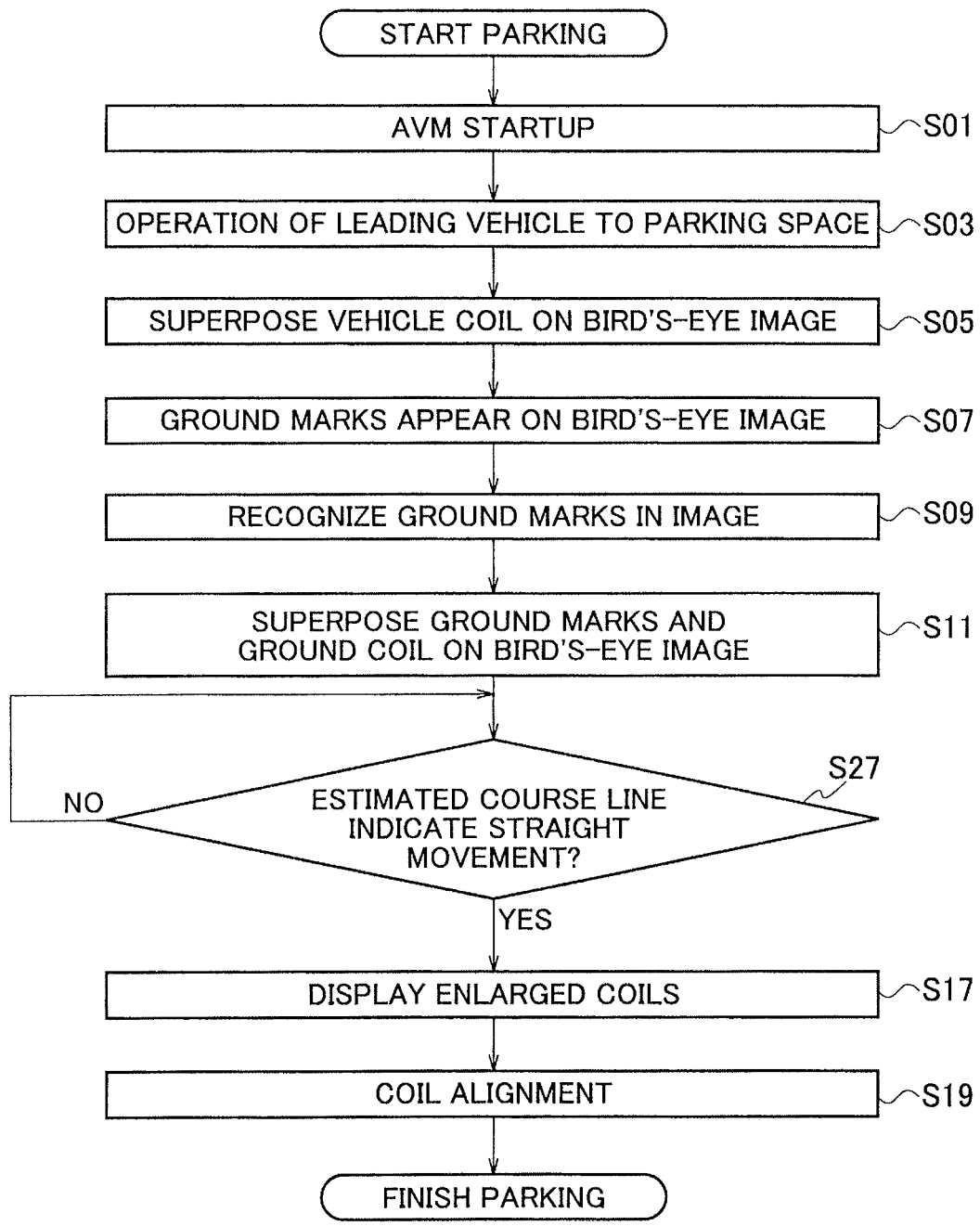
FIG. 9E is a flowchart illustrating a parking assistance method according to a fifth embodiment.

A parking assistance method according to the fifth embodiment is illustrated below with reference to FIG. 9E. The process in the flowchart shown in FIG. 9E includes step S27 instead of step S13 and step S15 shown in FIG. 9A. The other steps shown in FIG. 9E are the same as those in FIG. 9A, and overlapping explanations are not repeated below.

In step S27, the display control circuit 62 monitors the estimated course lines until the estimated course lines displayed on the display 53 indicate straight movement. When the determination is a positive result in step S27, the steering wheel can be determined to be in the neutral position. The operation on the steering wheel is thus almost completed, so as to start the coil alignment while moving the vehicle 1 in the front-rear direction. The process then proceeds to step S17, and the display switch unit 64 switches from the bird's-eye image to the enlarged image so as to display the enlarged image on the display 53. This facilitates the coil alignment since the relative position of the coils is displayed on an enlarged scale.

According to the fifth embodiment as described above, the enlarged image for facilitating the coil alignment can be presented at the point when the positioning adjustment of the vehicle 1 to the parking space is almost completed and the user only needs to move the vehicle 1 in the front-rear direction.

The functions described in the respective embodiments may be implemented in one or more processing circuits. A processing circuit includes a programmed processing device such as a processing device including an electric circuit. Such a processing device includes an application specific integrated circuit (ASIC) configured to execute the functions described in the respective embodiments or conventional circuit components.

While the present invention has been described above with reference to the embodiments, it should be understood that the present invention is not intended to be limited to the embodiments described above, and various modifications and improvements will be apparent to those skilled in the art within the scope of the present invention.

The enlarged image is not limited to the example shown in FIG. 5C, and may be any of images as illustrated in FIG. 10A to FIG. 10D. The enlarged images shown in FIG. 10A to FIG. 10D differ from the enlarged image shown in FIG. 5C in the aspect ratio, in which the length in the vehicle width direction is longer than the length in the front-rear direction of the vehicle 1. The enlarged images shown in FIG. 10A to FIG. 10D are thus preferably used as switched images at the point when the distance between the coils is decreased more than that shown in FIG. 5C.

Figure 10A:
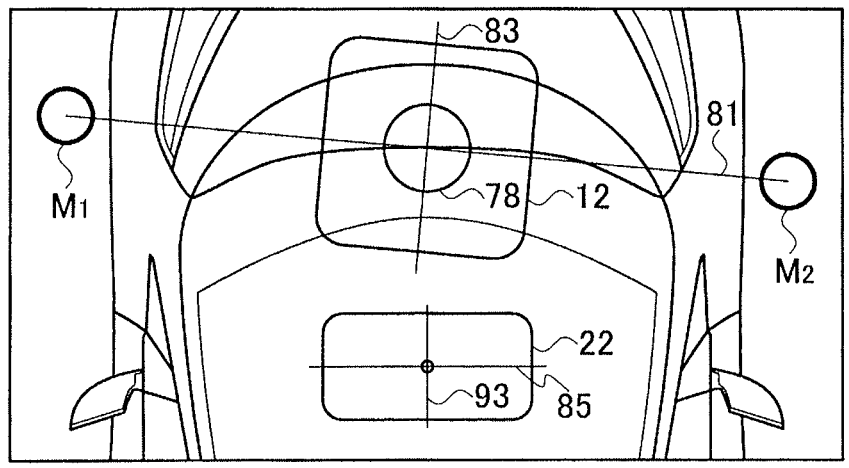
FIG. 10A is a view of an enlarged image illustrating forward parking.
Figure 10B:
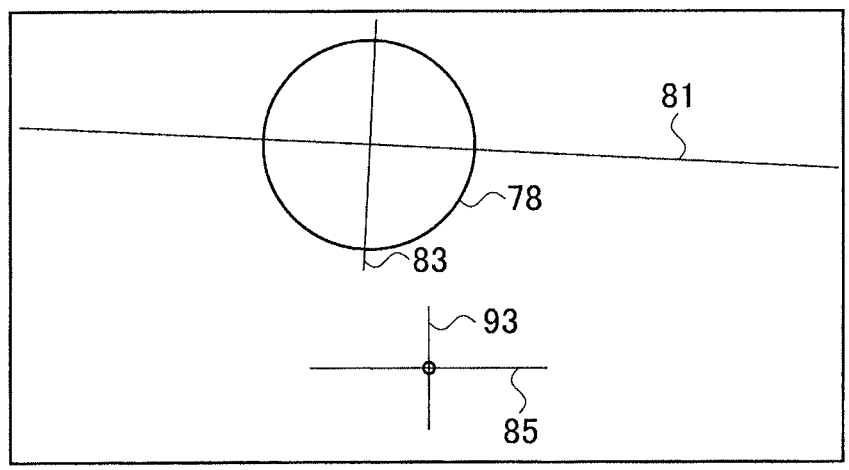
FIG. 10B is a view of an enlarged image illustrating forward parking.
Figure 10C:
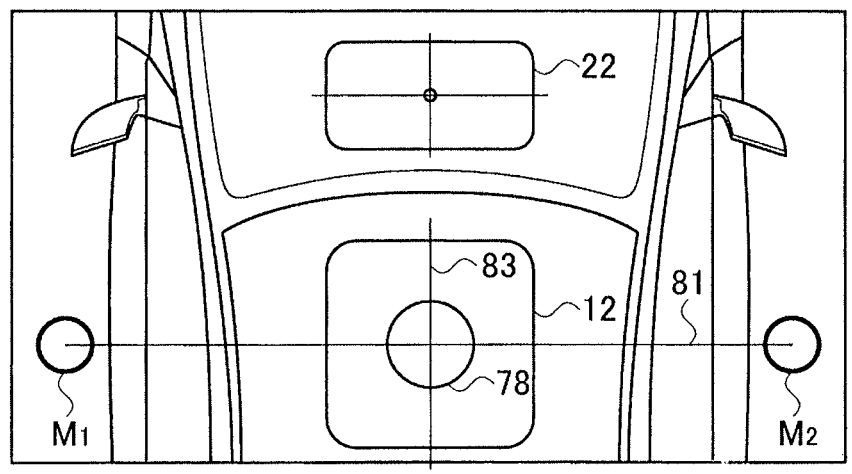
FIG. 10C is a view of an enlarged image illustrating backward parking.
Figure 10D:
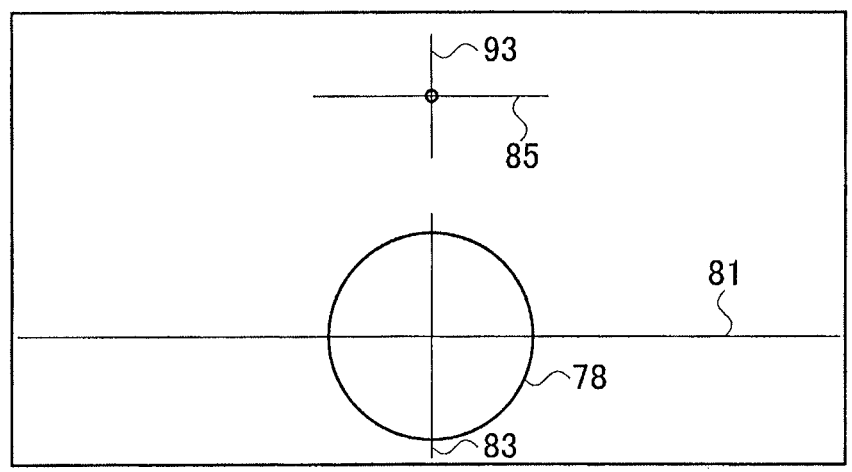
FIG. 10D is a view of an enlarged image illustrating backward parking.

FIG. 10A and FIG. 10B illustrate forward parking, and FIG. 10C and FIG. 10D illustrate backward parking. FIG. 10A and FIG. 10C each show CG images of the following elements superposed on the bird's-eye image:

The frame indicating the outline of the vehicle coil 22; two line segments (85, 93) extending in the vehicle width direction and the front-rear direction of the vehicle 1 and intersecting at the center of the vehicle coil 22; the ground marks ($M_1$, $M_2$); the line segment 81 connecting the ground marks ($M_1$, $M_2$); the frame indicating the outline of the ground coil 12; a line segment 83 vertical to the line segment 81 intersecting at the center of the ground coil 12 (the line segment 81); and the chargeable area 78 of the ground coil 12.

FIG. 10B and FIG. 10D illustrate images in which the bird's-eye images are eliminated from FIG. 10A and FIG. 10C and the coil parts are further enlarged. The CG images of the frame indicating the outline of the vehicle coil 22 and the frame indicating the outline of the ground coil 12 are eliminated from FIG. 10A and FIG. 10C. The unnecessary images for the coil alignment are eliminated, so as to further facilitate the coil alignment.

REFERENCE SIGNS LIST

1 Vehicle
2 Parking space
12 Ground coil
22 Vehicle coil
53 Display
55 Image controller
61 Image generation circuit
62 Display control circuit
71 Parking frame
86b Left-side region
86c Right-side region
87a, 87b Sub-coil
90, 91a, 91b Estimated course line
92 Bird's-eye image
93' Camera image
$M_1$, $M_2$ Ground mark

The invention claimed is:

1. A parking assistance method for providing parking assistance, using an image controller for generating a bird's-eye image including a vehicle and a circumference of the vehicle as viewed from above the vehicle from a camera image of the circumference of the vehicle captured and a display for displaying the bird's-eye image, when parking the vehicle in a parking space equipped with a ground coil for supplying electric power via a wireless connection to a vehicle coil mounted on the vehicle, at least two ground marks indicating a position of the ground coil, and a parking frame provided in the parking space, the method comprising:

switching from the bird's-eye image to an enlarged image showing a relative position between the ground coil and the vehicle coil on a larger scale than the bird's-eye image when an absolute value of a relative angle of a straight line connecting the ground marks to a straight line passing through a center of the vehicle coil and parallel to a vehicle width direction of the vehicle is a predetermined value or smaller.

2. The parking assistance method according to claim 1, wherein the bird's-eye image is switched to the enlarged image when the absolute value of the relative angle of the straight line connecting the ground marks to the straight line passing through the center of the vehicle coil and parallel to the vehicle width direction of the vehicle is a predetermined value or smaller, and the ground marks are shown in both a right-side region and a left-side region of the bird's-eye image.

3. The parking assistance method according to claim 1, wherein the bird's-eye image is switched to the enlarged image when the absolute value of the relative angle of the straight line connecting the ground marks to the straight line passing through the center of the vehicle coil and parallel to the vehicle width direction of the vehicle is a predetermined value or smaller, and a sub-coil mounted on the vehicle detects the electric power from the ground coil.

4. A parking assistance device used when parking a vehicle in a parking space equipped with a ground coil for supplying electric power via a wireless connection to a vehicle coil mounted on the vehicle, at least two ground marks indicating a position of the ground coil, and a parking frame provided in the parking space, the device comprising:

an image generation circuit configured to generate a bird's-eye image including the vehicle and a circumference of the vehicle as viewed from above the vehicle from a camera image of the circumference of the vehicle captured;
a display for displaying the bird's-eye image; and
a display control circuit configured to switch from the bird's-eye image to an enlarged image showing a relative position between the ground coil and the vehicle coil on a larger scale than the bird's-eye image when an absolute value of a relative angle of a straight line connecting the ground marks to a straight line passing through a center of the vehicle coil and parallel to a vehicle width direction of the vehicle is a predetermined value or smaller.

5. A parking assistance method for providing parking assistance, using an image controller for generating a bird's-eye image including a vehicle and a circumference of the vehicle as viewed from above the vehicle from a camera image of the circumference of the vehicle captured and a display for displaying the bird's-eye image, when parking the vehicle in a parking space equipped with a ground coil for supplying electric power via a wireless connection to a vehicle coil mounted on the vehicle and a parking frame provided in the parking space, the method comprising:

switching to an enlarged image showing a relative position between the ground coil and the vehicle coil on a larger scale than the bird's-eye image when at least an imaging frame indicating an outline of the ground coil is displayed superposed on the bird's-eye image and an absolute value of a relative angle between a longitudinal direction of the parking frame provided in the parking space and a front-rear direction of the vehicle is a predetermined value or smaller.

* * * * *